May 2, 1961 K. L. SMITH ET AL 2,982,742
ALKYLENE OXIDE POLYMERS
Filed June 27, 1957 4 Sheets-Sheet 1

INVENTORS
KEITH L. SMITH
EDWARD C. SELTZER
BY Vincent P. Pirri
ATTORNEY

INVENTORS
KEITH L. SMITH
EDWARD C. SELTZER
BY Vincent P. Pirri
ATTORNEY

INVENTORS
KEITH L. SMITH
EDWARD C. SELTZER

2,982,742
ALKYLENE OXIDE POLYMERS

Keith L. Smith, Charleston, and Edward C. Seltzer, St. Albans, W. Va., assignors to Union Carbide Corporation, a corporation of New York Filed June 27, 1957, Ser. No. 668,547

22 Claims. (Cl. 260—2)

This invention relates to alkylene oxide polymers. In one aspect this invention relates to the molecular degradation of alkylene oxide polymers. In another aspect this invention relates to the stabilization of alkylene oxide polymers against appreciable molecular degradation during storage and/or transit or the like.

The preparation of alkylene oxide polymers, that is, polymers of olefin oxides, such as poly(ethylene oxide), poly(propylene oxide), poly(butylene oxide) and the like which have a reduced viscosity in the range from about 1.0 to about 60, and higher, is the subject matter of the application entitled "Polymerization of Epoxides," by F. N. Hill and F. E. Bailey, Jr., Serial No. 587,933, filed May 29, 1956, now abandoned, and assigned to the same assignee as the instant application. The reduced viscosities of poly(ethylene oxide) referred to in the above-said application are measured in acetonitrile at a concentration of 0.2 gram of polymer per 100 milliliters of solvent at 30° C.; the reduced viscosities of the other alkylene oxide polymers are more conveniently measured in benzene. The above-mentioned application teaches the preparation of poly(alkylene oxide) by polymerizing alkylene oxide in contact with certain metal carbonate catalysts, such as, for example, calcium carbonate, barium carbonate, strontium carbonate and others. These metal carbonate catalysts are advantageously employed in concentrations in the range from about 0.3 to 3 parts by weight per 100 parts by weight of alkylene oxide. The polymerization reaction can be conducted in the liquid phase at a temperature in the range from about 70° to about 150° C. It is preferred that the metal carbonate catalyst contain not more than one part by weight of non-sorbed water per 100 parts by weight of monomer, and at least 0.01 part by weight of sorbed water per 100 parts by weight of catalyst. It is further preferred that the carbonate catalyst be free from ions which reduced their catalytic activity such as, for example, chlorate and thiosulfate ions.

For further information regarding the production of poly(alkylene oxide) reference is hereby made to the disclosure of the above-identified application Serial No. 587,933.

The preparation of granular poly(ethylene oxide) having a reduced viscosity in acetonitrile in the range from about 1.0 to about 60, and higher, is the subject matter of the application entitled "Polymerization of Epoxides and New Products Obtained Thereby," by F. N. Hill, J. T. Fitzpatrick, and F. E. Bailey, Jr., Serial No. 587,955, filed May 29, 1956, now abandoned, and assigned to the same assignee as the instant application. This application teaches the preparation of poly(ethylene oxide) by polymerizing ethylene oxide in contact with about 0.2 to about 10 parts by weight, per 100 parts by weight of monomer, of a catalyst such as the alkaline earth metal amides, hexammoniates, or the decomposition products of hexammoniates. The polymerization reaction is preferably conducted at a temperature in the range from about 0° to 70° C. and is carried out in the presence of a liquid organic medium such as the normally liquid straight and branch chain saturated hydrocarbons, cyclic and alkyl-substituted cyclic saturated hydrocarbons and the like, e.g., heptane, methylcyclopentane, etc., said organic medium being soluble for ethylene oxide and insoluble for poly(ethylene oxide). Agitation of the reaction mixture during the polymerization results in the production of granular ethylene oxide polymer having a reduced viscosity in acetonitrile above about 1.0, and generally above about 30 and up to 60, and higher. The granular poly(ethylene oxide) can be recovered from the reaction mixture by decanting the organic medium and vacuum drying the ethylene oxide polymer. The poly(ethylene oxide) is obtained in a granular state, i.e., a finely divided solid particle form resembling in particle size finely divided sand. For further information regarding the production of granular poly(ethylene oxide) reference is hereby made to the disclosure of application Serial No. 587,955.

The understanding and practice of the instant invention will be greatly facilitated by defining various terms which will be referred to hereinafter.

By the term "reduced viscosity," as used herein, is meant a value obtained by dividing the specific viscosity by the concentration of the polymer in the solution, the concentration being measured in grams of polymer per 100 milliliters of solvent at a given temperature, and is regarded as a measure of molecular weight. The specific viscosity is obtained by dividing the difference between the viscosity of the solution and the viscosity of the solvent by the viscosity of the solvent. Unless otherwise stated, the reduced viscosities herein referred to are measured at a concentration of 0.2 gram of polymer in 100 milliliters of acetonitrile at 30° C. Also, unless otherwise stated herein, the reduced viscosity of the alkylene oxide polymers, particularly poly(ethylene oxide), have a value of at least 1.0 and upwards to 60, and higher.

By the term "intrinsic viscosity" is meant the value at the zero concentration of the reduced viscosity concentration curve. In other words, intrinsic viscosity is, in effect, the reduced viscosity extrapolated to the zero concentration of polymer solution.

The term "aqueous bulk viscosity," as used herein, refers to the viscosity of the stated concentration of polymer in water, as measured at two revolutions per minute on a model RVF Brookfield viscometer at ambient room temperature, i.e., about 24° C. to 27° C.

The term "pituitous," as used herein, refers to the stringy or mucus-like nature of solutions of certain types of polymer. The pituitous behavior is measured quantitatively in a Du Nuoy tensiometer normally used for determining the surface tensions of liquids. Surface tension is run in the usual manner on this machine, and then the liquid "string" which form between the tensiometer ring and the solution surface is observed. The time in seconds between formation of this string and its spontaneous rupture is reported as the pituitous rating of the particular solution. The influence of stray air currents should be avoided in running this test.

The term "apparent viscosity," as used herein, refers to the calculation by the use of Hagan-Poiseuille expression for the determination of absolute viscosity based upon the assumption of Newtonian material. The word "apparent" is applied because viscosity is calculated by this means although a non-Newtonian material is presumed. In a Newtonian material shear rate varies linearly with shear stress during flow. In a non-Newtonian material shear rate does not vary linearly with shear stress during flow. The term "shear rate" can be defined as the first derivative of velocity with respect to the distance normal to the direction of velocity, and is expressed in reciprocal seconds. The apparent viscosity of alkylene oxide polymers in the range from about 200 to about 120,000 poises (at 150° C., 10 to 2,000 p.s.i.g.) approximately corresponds to the reduced viscosity, for example, of ethylene oxide polymers having a value in the range from about 1.0 to about 60. The apparent viscosity of the alkylene oxide polymers referred to in this specification, unless otherwise stated, is in the range from about 200 to about 120,000 poises at the above-stated conditions of temperature and pressure.

The term "bulk polymerization process," as used herein, refers to polymerization in the absence of an organic medium or diluent. The term "solution polymerization process," as employed herein, refers to polymerization in the presence of an organic medium or diluent which is soluble for both the monomer employed and polymer produced. The term "suspension polymerization process," as used herein, refers to polymerization in the presence of an organic medium which is soluble for the monomer employed and insoluble for the polymer produced. A granular polymer, such as granular poly(ethylene oxide), results from the suspension polymerization of an agitated reaction mixture comprising ethylene oxide in contact with a polymerization catalyst therefor, e.g., calcium amide, in the presence of an organic medium, e.g., heptane, which organic medium is soluble for ethylene oxide and insoluble for poly(ethylene oxide). The granular poly(ethylene oxide) thus produced is obtained in a finely divded solid particle state and resembles finely divided sand in particle size. Unlike the granular poly(ethylene oxide) resulting from the suspension polymerization process, the bulk and solution polymerization processes yield a polymer which is substantially a homogeneous mass either conforming the shape of the reaction vessel or, after driving off the organic medium, for example, by mechanical extrusion, e.g., Marshall Mill (under vacuum and at slightly elevated temperatures), resembling layers or sheets. This polymer subsequently can be reduced in particle size, for example, by dicing or the like.

The term "granular," as used herein, refers to the particle size of the alkylene oxide polymers, for example, poly(ethylene oxide) prepared by suspension polymerization. A granular polymer product is one which is in a free flowing state and comprises particles less than 5 mesh in size (U.S. Standard size sieve).

By the terms "stabilizing," "stabilization," and "stable," as used herein, is means the process, act, or condition whereby the alkylene oxide polymer is treated or has been treated according to this invention, and the treated polymer is thereby rendered stable against substantial molecular degradation during storage and/or transit for a period of several days, e.g., one week.

Also, it will be found advantageous throughout the instant specification to refer interchangeably to the reduced viscosity and the 1.0 weight percent and 5.0 weight percent aqueous bulk viscosity of the polymers of this invention. The relationships between these values insofar as they apply to poly(ethylene oxide) treated with peracetic acid is set forth in Table I below:

TABLE I

*Relation between aqueous bulk viscosities and reduced viscosities in acetonitrile and in water for poly(ethylene oxide) resins treated in various ways to reduce the viscosity level*

| Peracetic Acid Weight Percent [1] | Reduced Viscosity | | Aqueous Bulk Viscosity at 25° C., cps. | |
|---|---|---|---|---|
| | 0.2 g. Polymer/100 ml. Acetonitrile at 30° C. | 0.2 g. Polymer/100 ml. of H₂O at 30° C. | 1.0 wt. percent [2] | 5.0 wt. percent [2] |
| 0.1 | 35.8 | | 3,155 | |
| 0.1 | 11.5 | | | 77,000 |
| 4.0 | | 1.96 | | 2,060 |
| 5.0 | 1.32 | | | 200 |
| 5.0 | | 0.612 | | 155 |

[1] Based on the weight of polymer.
[2] Based on the weight of solution.

Alkylene oxides, that is, olefin oxides, such as ethylene oxide, propylene oxide, butylene oxide, and the like, or a mixture of ethylene oxide with other alkylene oxides, can be polymerized to form resin, i.e., polymer, having a reduced viscosity in acetonitrile in the range from about 1.0 and upwards to 60, and higher. The polymerization reaction can be a bulk or solution polymerization process, or, in other words, the polymerization can be carried out, respectively, in the absence or presence of a solvent which is soluble for the polymer produced. The polymeric products thus obtained are eminently satisfactory for certain uses, and such bulk and solution processes are highly desirable ones. Nevertheless, these processes possess certain disadvantages, and the polymer produced, for many fields of application, are undesirable. The solution polymerization process requires in most instances equipment designed for higher temperature and pressure than is necessary if the polymer is made by the suspension polymerization process. Moreover, in the solution polymerization process the resulting polymer is obtained as a solution in the organic medium. It is evident, therefore, that the recovery of the polymer from the contained solution necessitates additional equipment and further treating steps to obtain substantially solvent-free polymer.

For many applications and uses poly(ethylene oxide) produced by the bulk or solution polymerization processes entail solution, oftentimes in water, as a first step. Although the polymer appears to form homogeneous systems with water over a wide concentration range of polymer is diluent, the solution of relatively large polymeric particles (of the order, for example, of ¼ inch and upwards in diameter) takes place at an extremely slow rate. Solution of the polymer and diluent can be facilitated, in general, by decreasing the polymer particle size by mechanical expedients such as pulverizng, grinding and the like. However, these polymers are difficult to pulverize because of their inherently resilient nature. Furthermore, such mechanical expedients add to the uneconomical aspects of the applications or uses which are contemplated.

The molecular degradation of alkylene oxide polymers, e.g., poly(ethylene oxide), by the practice of this invention give polymers which dissolve, for example, in water, at a relatively faster rate than the non-degraded polymer having an equivalent reduced viscosity. For those applications which require polymer solutions, a faster rate of dissolution in the solvent media is a decided economic advantage.

It has been observed that poly(ethylene oxide) degraded according to the practice of this invention give aqueous solutions which are less pituitous than the non-degraded polymer having an equivalent reduced viscosity. In various applications, a lower pituitous characteristic of the polymer in solutions can be an added advantage such as, for example, in knife or roller coating work, e.g., film casting.

As stated previously, the production of granular poly(ethylene oxide) having a reduced viscosity in the range from about 1.0 to about 60, and higher, and preferably from above 30, by the suspension polymerization process, is the subject matter of application Serial No. 587,955. Granular poly(ethylene oxide) having a reduced viscosity below about 30, and generally, below about 20, prepared in accordance with the process of the above-identified application possesses, in certain instances, the undesirable property of high ash content. The high ash content from catalyst residue remaining with the polymer appear to be the result of high ratios of catalyst to polymer produced whereas the preparation of granular poly(ethylene oxide) having a reduced viscosity above about 30 oftentimes require relatively lower ratios of catalyst to polymer produced. In various applications and uses, such as in the fields of film, sheet and molding manufacture, the ash content of the polymer assumes a significant role. A relative high ash content results, for example, in cloudy and oftentimes opaque films or sheets. Aqueous solutions of these high ash content polymers likewise give cloudy to opaque solutions which make them undesirable or less attractive for many uses. Moreover, the catalyst is an expensive ingredient in the preparation of these granular polymers; thus, it is apparent that relatively high ratios of catalyst to granular polymer product constitute an uneconomical feature.

Furthermore, it has been discovered that by the practice of this invention an alkylene oxide polymer can be obtained which is relatively stable against further molecular degradation during storage and/or transit for a period of several days.

Accordingly, one or more of the following objects will be achieved by the practice of this invention:

It is an object of this invention to provide a novel process for decreasing the reduced viscosity or apparent viscosity of alkylene oxide polymers. It is another object of this invention to provide a novel process for the molecular degradation of alkylene oxide polymer having a reduced viscosity in the range from about 1.0 to 60, and higher. It is a further object of this invention to provide a novel process for decreasing the reduced viscosity of poly(ethylene oxide) by treatment with a peroxide compound described hereinafter. It is a still further object of this invention to reduce the molecular weight of granular poly(ethylene oxide) by contacting same with a peroxide compound contained in an organic medium, said organic medium being insoluble for said poly(ethylene oxide). It is a yet further object of this invention to provide alkylene oxide polymers which, aqueous solutions thereof, are essentially non-pituitous. It is another object of this invention to provide a novel process for reducing the aqueous bulk viscosity of alkylene oxide polymer having a reduced viscosity above about 1.0 by contacting said polymer with a peroxide compound hereinafter described. Another object of this invention is to provide inexpensive and controllable methods for producing lower molecular weight alkylene oxide polymer from correspondingly higher molecular weight alkylene oxide polymer which have reduced viscosities in the range from about 1.0 and upwards to 60, and higher. A yet further object of this invention is to provide a novel process for preparing a substantially stabilized, molecular degraded alkylene oxide polymer. Another object of this invention is directed to a novel process of stabilizing an alkylene oxide polymer without incurring substantial molecular degradation of said polymer during said process. A further object of this invention is directed to novel, molecular degraded alkylene oxide polymers, particularly poly(ethylene oxide), having a lower pituitous and relatively faster dissolution characteristics than the corresponding undegraded polymer of equivalent reduced viscosity. These and other objects will become apparent to those skilled in the art from a consideration of the instant disclosure.

Figure 1 corresponds to the results obtained from Examples 14–18 inclusive, and Figures 2 to 10 corresponds to the results obtained from Examples 19 to 27, respectively.

Broadly speaking, the present invention is directed to decreasing the molecular weight of alkylene oxide polymers by contacting said polymers with a peroxide compound. By practicing the process of the instant invention under various conditions, for example, of temperature and concentration of peroxide compound, the molecular degradation of the polymer can be substantially controlled. Moreover, by contacting the molecular degraded polymer with an alkaline material in an amount which is at least sufficient to neutralize said polymer, a polymer which is substantially stable against further molecular degradation during storage and/or transit for a period of several days, e.g., one week, can be obtained. It also has been observed that a non-degraded alkylene oxide polymer, i.e., a polymer which is not substantially degraded according to the practice of this invention, can be rendered substantially stable by incorporating therein a quantity of peroxide compound in an amount which is insufficient to cause substantial molecular degradation of said polymer, followed by adding thereto an alkaline material in an amount which is at least sufficient to neutralize said polymer.

It is pointed out that the alkylene oxide polymers which are subjected to the various aspects of the instant invention possess a reduced viscosity of at least 1.0 and upwards to 60, and higher. Should said polymers be expressed or identified in terms of intrinsic viscosity, apparent viscosity, or aqueous bulk viscosity, then these latter viscosities would be, in effect, equivalent to the corresponding reduced viscosity in the range from about 1.0 to about 60, and higher. Also, the term "peroxide compound," as used herein and set forth in greater detail elsewhere in this specification, refers to a compound containing the bivalent—O—O—group, in which the two adjacent oxygen atoms are singly linked.

In one embodiment of this invention the molecular weight or apparent viscosity of alkylene oxide polymers which have apparent viscosities in the range from about 200 to about 120,000 poises, and higher, can be decreased by contacting said polymers with a peroxide compound. In general, the correlation of various factors will determine, to an extent, the degree of molecular degradation of the polymer. Such factors include, among others, the particular polymer employed, the apparent viscosity or molecular weight of the polymer, the particular peroxide compound used, the concentration of the peroxide compound, the temperature at which molecular degradation is effected the period of time of the degradation process, and other considerations. By conducting the molecular degradation process within the operable temperature range, discussed hereinafter, it has been observed that a higher temperature generally shortens the period of time necessary for molecular degradation of the polymer than a lower temperature. Along the same vein a higher concentration of peroxide compound generally will decrease the time period for degrading the alkylene oxide polymer than a lower peroxide compound concentration.

Broadly, a peroxide compound concentration range of from about 0.05 to about 15.0 weight percent, and higher, based on the weight of the polymer, has been found to be suitable. However, it has been observed that a peroxide compound concentration less than 1.0 weight percent based on the polymer weight does not result in substantial molecular degradation of the polymer, and hence, a preferred lower limit of concentration of peroxide compound is about 1.0 weight percent. The preferred upper concentration limit of peroxide compound will be governed, to an extent, upon the preferred temperature range of the degradation process. Operating within the preferred temperature range, the upper limit of peroxide compound concentration is below that concentration at which "balling," "blocking" or "agglomeration" of the polymer results. By the above-quoted terms is meant the sticking together of the polymer particles, whether said particles as originally employed are granular in size or have been pelleted to a particle size, for example, of ⅛ to ¼ inch in diameter, so that the polymer ceases to flow freely. In other words, the polymer particles agglomerate to form exceedingly larger particles or these agglomerated particles can be a polymeric mass assuming the shape of the vessel.

Illustrative peroxide compounds which are contemplated by the process of the instant invention include, among others, hydrogen peroxide, peracetic acid, t-butyl hydroperoxide, cumene hydroperoxide, diacetyl peroxide, dibenzoyl peroxide, diethyl peroxide, peroxybenzoic acid, and others. Hydrogen peroxide and peracetic acid are preferred, with the latter being especially preferred. The hydrogen peroxide can be employed as an aqueous solution containing from about 20 to 90, and preferably from about 30 to 90, weight percent of hydrogen peroxide based on the solution weight, whereas the peracetic acid can be employed as a solution in ethyl acetate, acetic acid and the like, which solutions contain from about 10 to 50 weight percent of peracetic acid based on the solution weight, and preferably from about 20 to 40 weight percent of peracetic acid based on the solution weight.

In principle, the operable temperature for effecting the molecular degradation process can vary over a wide range. The lower temperature limit would be the freezing point of the peroxide compound providing such peroxide compound as a normally liquid compound. If the alkylene oxide polymer is slurried in an organic medium, which embodiment is discussed hereinafter, then the lower temperature limit would be the freezing point of the organic medium. In principle, the upper temperature would be the boiling point of the organic medium or the decomposition temperature of the peroxide compound. In general, the molecular degradation reaction can be carried out at a temperature in the range from about 15° to about 150° C. However, in view of the inherently dangerous nature of peroxide compounds, and added equipment costs, elevated temperatures are not preferred for effecting the degradation process. Regarding the embodiment of this invention directed to degrading alkylene oxide polymer in contact with a peroxide compound, a temperature in the range from about 15° to 100° C. is satisfactory. A particularly preferred temperature range is from about 20° C. to that temperature in which the polymer blocks or agglomerates, e.g., about 48° to 55° C. for granular or pelleted poly(ethylene oxide).

As stated previously the period of time required to effect molecular degradation of the polymer is a function of various factors such as the reaction temperature, the concentration of peroxide compound, the reduced viscosity of polymer, and other considerations. In general, a period of time in the range from about minutes to several hours, e.g., from about ten minutes to about 24 hours, has been found to be satisfactory. A reaction period from about ten minutes to about 3 to 4 hours is preferred. Of course, the time factor will depend to a large extent on the degree of molecular degradation desired. As will be shown hereinafter in the operative examples, the molecular degradation process generally can be terminated once the polymer approaches the approximate predetermined reduced viscosity.

In a particularly preferred embodiment this invention is directed to a process for decreasing the molecular weight or reduced viscosity of granular poly(ethylene oxide), previously described, which has a reduced viscosity range of from above about 1.0 to 60, and higher, and preferably above about 30. The ethylene oxide polymer is admixed with a peroxide compound such as those listed previously, and subsequently is maintained at a temperature which is preferably below the print point of the polymer. A temperature in the range from about 20° to below the print point, e.g., about 53°–55° C., of the poly(ethylene oxide) has been observed to be satisfactory with the rate of molecular degradation increasing as the operative temperature increases. The concentration of peroxide compound employed can be in the range from about 1.0 to 10 weight percent, and higher, based on the weight of poly(ethylene oxide), however, it has been observed that in the upper concentration range of peroxide compound, agglomeration or balling of the polymer can result in the upper portion of the operative temperature range. Consequently, to obtain molecularly degraded poly(ethylene oxide) in granular form, i.e., as finely divided solid particles, it is preferable to limit the concentration of the peroxide compound below which agglomeration of the polymer occurs at the operative temperature employed. The reaction period will depend upon the variables previously set out. In general, a period of time ranging from about 5 minutes to several hours, e.g., 24 hours can be employed to obtain granular poly(ethylene oxide) of lower molecular weight or reduced viscosity than the corresponding polymer used as starting material. A preferred reaction period is from about 10 minutes to about 3 to 4 hours. Of course, the time factor would be limited by the degree of molecular degradation desired. As will be apparent from subsequent operative examples, granular poly(ethylene oxide) can be molecularly degraded to an approximate predetermined molecular weight or reduced viscosity by the practice of this invention. The advantages of producing molecular degraded poly(ethylene oxide) in granular form are evident. These polymers show considerable improvement in resin dry flow properties as measured by the angle of repose or pour angle of such resin powders. There is less tendency for these powdery polymers to block or agglomerate on storage and handling. They dissolve to form aqueous solutions more readily and easily than the comparable untreated polymer. Other advantages and features possessed by the degraded polymer are discussed elsewhere in this specification.

Another embodiment of this invention is directed to decreasing the molecular weight or apparent viscosity of alkylene oxide polymers which have apparent viscosities in the range from about 200 to about 120,000 poises, and higher (approximately equivalent to reduced viscosities in the range from about 1 to about 60), by slurrying said polymer in an organic medium which contains a peroxide compound. This embodiment of the invention is admirably suitable for the molecular degradation of granular poly(ethylene oxide) having reduced viscosities above about 1.0, preferably above about 30, and upwards to 60, and higher. The organic media contemplated are those which are insoluble for the polymer. The choice of organic medium in which the polymer is slurried is not narrowly critical providing the organic liquid does not swell or otherwise solvate the polymer at the operating temperatures desired.

The organic media which are contemplated include, among others, the normally liquid saturated hydrocarbons such as the saturated aliphatic, saturated cycloaliphatic, and alkyl-substituted saturated cycloaliphatic hydrocarbons, and the like; organic ethers such as dialkyl ethers, lower glycol dialkyl ethers, cyclic organic ethers, and the like; normally liquid saturated hydrocarbon fractions derived from petroleum, and the like. Illustrative organic media include pentane, hexane, heptane, isoheptane, ethylpentane, octane, nonane, decane, cyclopentane, cyclohexane, butylcyclohexane, 1,2-dimethylcyclohexane, decahydronaphthalene, dimethyl ether, dipropyl ether, methyl butyl ether, dihexyl ether, dioctyl ether, dimethyl-, diethyl-, dipropyl-, dibutyl ethers of ethylene and propylene glycols, dioxane, and the like. Saturated aliphatic hydrocarbons are preferred with heptane and closely related homologous compounds being especially preferred.

For efficient operation it is desirable that as large a concentration of alkylene oxide polymer to total slurry weight be used. However, it has been found that an upper limit of polymer concentration to total slurry weight exists if agglomeration of the polymer is to be avoided. In general, it has been observed that a granular poly(ethylene oxide) slurry containing up to approximately 30 weight percent of poly(ethylene oxide), based on the total weight of poly(ethylene oxide) and organic medium, is desirable. Concentrations of poly(ethylene oxide) above about 30 weight percent tend to agglomerate, and consequently, concentrations of polymer above this amount are not preferred. The upper limit regarding the quantity of organic medium which is necessary is governed primarily by practical and economic considerations. A slurry containing as little as 2.0 weight percent of granular poly(ethylene oxide), and lower, based on the total weight of poly(ethylene oxide) and organic medium, is suitable. All factors considered, however, it is preferred to employ a slurry containing from about 5.0 to about 20.0 weight percent of granular poly(ethylene oxide), based on the total weight of poly(ethylene oxide) and organic medium.

The molecular degradation of granular poly(ethylene oxide) slurried in an organic medium can be effected at a temperature from about the freezing point of the organic medium under the operative conditions employed to the temperature at which the polymer tends to block and/or agglomerate at the particular peroxide compound concentration. As a practical matter no advantages are apparent in conducting the degradation process below about 20° C. Agglomeration of the granular poly(ethylene oxide) slurry occurs at temperatures above about 50° C., consequently, temperatures below about 50° C. (or below that temperature at which agglomeration is manifest) are preferred.

Illustrative peroxide compounds which can be employed in the molecular degradation of alkylene oxide polymer slurried in organic liquid include the peroxide compounds enumerated previously. For the molecular degradation of granular poly(ethylene oxide), peracetic acid is especially preferred. The peracetic acid is preferably added as a solution in ethyl acetate, acetic acid, or the like. A solution comprising from about 20 to 40 weight percent of peracetic acid based on the total solution weight (peracetic acid plus, for example, ethyl acetate), is preferred.

The concentration of peroxide compound which can be employed in the degradation of the polymer slurry embodiment can vary over a wide range. A peroxide compound concentration as low as 0.05 weight percent, based on the weight of the polymer, is effective. A higher concentration of peroxide compound will, in general, hasten the period of time required for degradation. The upper limit regarding the peroxide compound concentration is preferably kept below that concentration wherein balling or agglomeration results. For peracetic acid, the upper concentration limit would be approximately 10 weight percent (based on the polymer weight); for hydrogen peroxide from about 5 to about 10 weight percent is suitable.

It is preferred to conduct the molecular degradation reaction of alklene oxide polymer slurry, especially granular poly(ethylene oxide) slurry, for a period of time not exceeding about three hours since embrittlement of the polymer can result. In general, a reaction period in the range from about minutes, e.g., ten minutes, to two hours is preferred. Of course, the particular polymer, peroxide compound, and/or organic medium employed, the reduced viscosity of the polymer, the concentration of the peroxide compound, the degree of molecular degradation desired, etc., are factors which will govern, to an extent, the reaction period.

The molecular weight or reduced viscosity of alkylene oxide polymer slurried in a liquid organic medium (which contains a peroxide compound) can be decreased by subjecting the slurry to shearing forces such as high speed stirrers, extrusion, millrolls, calendering, ultrasonic waves, and the like. Therefore in another embodiment of this invention the alkylene oxide polymer slurry which contains a peroxide compound can be subjected to shearing forces thereby increasing the rate of molecular degradation. In a particularly preferred embodiment granular poly(ethylene oxide) slurried in an organic medium which contains a peroxide compound of the type previously described can be subjected to shearing forces so that a faster rate of molecular degradation of the polymer is obtained. A shear rate of at least 1,000 reciprocal seconds is contemplated, and the greater the shear rate the greater the molecular degradation of the polymer. As with the preceding embodiments of this invention, the temperature is preferably maintained in the range from about 20° C., or lower, to that temperature at which agglomeration is manifest, i.e., below about the print point of the alkylene oxide polymer. For poly(ethylene oxide), the preferred upper temperature limitation is about 50° C. The peroxide compound concentration is approximately the same as set out previously in the embodiment directed to the degradation of polymer slurried in an organic medium which contains a peroxide compound. The reaction period is preferably maintained below about 3 hours, with a reaction period range from about 10 minutes to about 2 hours being particularly effective.

It is further pointed out that an alkylene oxide polymer slurry without the incorporation therein of a peroxide compound can be molecularly degraded, though at a slower rate, by subjecting said polymer slurry to shearing forces such as by extrusion, pumping through a narrow pipe, Banbury mixer, high speed stirrers, e.g., a laboratory Osterizer, ultrasonic waves, and the like.

The molecular degraded polymer of this invention completion of the viscosity reducing process often contains some residual peroxide compound absorbed thereon, or the polymer can be contaminated with residues of peroxide compound such as acid residues depending on the particular peroxide compound employed. If the degraded polymers are to be used shortly after the completion of the process, or should the stability of said polymers be considered relatively unimportant, then relatively strong peroxide compounds such as peracetic acid and the like can be employed without regard to counteracting the continued effect of these peroxide compounds on the treated polymer at the conclusion of the degrading operation.

It has been observed that alkylene oxide polymers degraded according to the process of this invention, especially alkylene oxide polymers slurried in an organic medium which medium contains a peroxide compound, can be rendered substantially stable against further molecular degradation by extracting or washing the polymer upon the completion of the degradation operation with an organic diluent which is insoluble for the polymer until a substantially neutral pH polymer is obtained. In a further preferred aspect the number of washes or extractions can be appreciably reduced by conducting this treatment in the presence of an alkaline material, described hereinafter, so that an essentially neutral to alkaline pH polymer results. By the practice of this aspect of the invention, the alkylene oxide polymer can be stored for a period of several days, e.g., one week or longer, without appreciable molecular degradation thereof.

It has been pointed out previously in this disclosure that alkylene oxide polymers can be molecularly degraded in the presence of a peroxide compound at a concentration as low as 0.05 weight percent (based on the polymer weight) and upwards to 15.0 weight percent, and higher. By employing a peroxide compound concentration greater than 1.0 weight percent, substantial molecular degradation of the polymer can be obtained when the degradation operation is conducted within the previously described operative conditions. Upon completion of the degradation reaction, the step of rendering the polymer essentially neutral to alkaline will stabilize said polymer against further appreciable degradation during storage and/or transit.

However, by effecting the degradation treatment of the polymer slurry in the presence of less than 1.0 weight percent of peroxide compound, particularly peracetic acid, based on the polymer weight, and preferably from about 0.05 to about 0.3 weight percent of peroxide compound, for a period of time ranging from about 10 minutes to 2 hours, and preferably from about 30 minutes to about 60 minutes, at a temperature insufficient to cause agglomeration of the polymer, i.e., below about 50° C., and preferably below about 45° C., a polymer is obtained whose molecular weight is not radically decreased. Following this treatment with the washing step (in the absence or presence of an alkaline material) will give an essentially neutral to alkaline polymer.

The "neutralization" treatment of the polymer results in the substantial removal of adsorbed peroxide compound on the polymer and/or residual acid residues, e.g., acetic acid, contained in the polymer. One method of accomplishing this removal after termination of the degradation operation (whether the degradation process causes relatively little or radical molecular degradation of the polymer) is to separate the polymer, e.g., poly-(ethylene oxide), from the liquid organic medium, for example, by decanting, followed by reslurrying said polymer in a fresh liquid organic medium such as heptane or similar normally liquid saturated aliphatic hydrocarbons such as those saturated hydrocarbons exemplified previously for several minutes, e.g., from about 10 to 30 minutes, at room temperature. The reslurry media, and the amounts of polymer to reslurry media, are essentially the same as those set out in the degradation embodiments discussed previously. The reslurry treatment can be repeated, if desired, and preferably terminated when an essentially neutral polymer is obtained. Isopropanol or anhydrous acetone are particularly preferred because of their greater extractive power for the acid residues. The washed polymer is preferably dried at room temperature in a gently flowing air stream for several hours, i.eg., 16 hours. This exemplified treatment renders the polymer substantially stable against molecular degradation for a period of several days. Another method whereby acid remaining from the viscosity reducing process can be neutralized is by the addition of an alkaline material which is preferentially adsorbed by the polymer or otherwise reacts with the acidic residue or residual peroxide compound present on and/or in the polymer particles. The alkaline material preferably is soluble in or dispersible in the liquid organic medium employed. Illustrative of the materials suitable for the "neutralization" treatment include di(2-ethylhexyl)amine, triethanolamine, and others. The above exemplified alkaline materials can be employed in an amount at least sufficient to neutralize the acid residue and/or residual peroxide compound present at the termination of, for example, the peracetic acid degradation reaction. In a preferred aspect, however, an amount of alkaline material which is insufficient for complete neutralization of acid residue and/or residual peroxide compound can be added during the washing or extraction steps, and preferably added upon the termination of the wash treatment thereby decreasing the number of extractions or organic washes necessary to obtain an essentially neutral polymer. For example, an amount of di(2-ethylhexyl)amine equal to approximately one-quarter of the concentration of peracetic acid (weight basis) employed in the degradation process will reduce the number of extractions or washes, for example, with heptane, from five to approximately three in order to achieve an essentially neutral pH granular ethylene oxide polymer.

Another method whereby polymer containing acid residues remaining from viscosity reducing reactions described and contemplated in this invention can be neutralized is by purging the polymer slurry with anhydrous ammonia gas or other alkaline reacting gaseous material preferably at ambient room temperature and pressure or at slightly elevated temperatures and reduced pressures, i.e., below that temperature at which the polymer agglomerates, until an essentially neutral to alkaline pH polymer is obtained. This "neutralization" step can be satisfactorily performed when the polymer is suspended, i.e., slurried, in heptane or similar normally liquid saturated aliphatic hydrocarbon such as those previously described. However, ammonia solubility in heptane and similar aliphatic hydrocarbons is substantially limited, and consequently, under certain conditions of processing it is preferred to use a non-solvent suspending medium, i.e., a liquid medium which is insoluble for the alkylene oxide polymer, such as, for example, anhydrous isopropanol or anhydrous acetone in which the anhydrous ammonia gas or other alkaline reacting material has a greater solubility therein.

One desirable method of determining the pH of the polymer during the "neutralization" treatment with alkaline material is to remove a sample of the polymer during said treatment step, wash same with a normally liquid saturated aliphatic hydrocarbon such as heptane, then decant the hydrocarbon wash from the resulting slurry, dry the washed polymer, and subsequently dissolve the polymer in water. The operator then can use conventional techniques on the aqueous solution containing dissolved polymer in order to determine the pH of the solution.

It is particularly preferred to incorporate an antioxidant in the liquid wash medium preferably after the "neutralization" treatment but prior to separation of the polymer from the liquid organic medium such as those which form the subject matter of application Serial No. 587,953, entitled "Chemical Process and Product," by F. N. Hill, filed May 29, 1956, and assigned to the same assignee as the instant application. Among the antioxidants disclosed in the above-mentioned application include the use of diamine derivatives such as N,N-di(2-hydroxypropyl)-di-(2-hydroxyethyl)ethylenediamine, N,N,N'-tri(2-hydroxypropyl)-N'-(2-hydroxyethyl)ethylenediamine, N,N,N',N'-tetrakis(2 - hydroxypropyl)ethylenediamine, and others. Advantageous results are obtained by employing these antioxidants at a concentration in the range from about 0.5 to 5 weight percent, and higher, based on the polymer weight.

The alkylene oxide polymer recovered from the liquid organic medium upon completion of the "neutralization" process, with or without the incorporation of an antioxidant such as those antioxidants exemplified above, have been observed to be remarkably stable against appreciable molecular degradation during storage and/or transit for a period of several days. By employing the diamine derivatives illustrated above, stabilization of the alkylene oxide polymer is further enhanced for even longer periods of time.

The ethylene oxide polymer throughout of reduced viscosities from about 1.0 and upwards to 60, and higher, are water-soluble. They appear to form homogeneous systems with water in all proportions, although the higher molecular weight polymers merely swell on the addition of small amounts of water. On the addition of greater amounts of water, the polymers pass into solution. The water solutions are viscous, the viscosity increasing both with the concentration of the polymer in the solution and the reduced viscosity of the polymer. These polymers of ethylene oxide show little change in melting point with increased reduced viscosity (an indication of increased molecular weight) and the melting point, as measured by change in stiffness with temperature, was found to be about 65°±2° C. throughout the range of reduced viscosities of from about 1.0 to 10, and greater. These polymers, upon X-ray examination show the sort of crystallinity exhibited by polyethylene. The crystallization temperature, as determined from measuring the break in the cooling curve, is about 55° C. The polymers of ethylene oxide possessing a reduced viscosity of at least 1.0 are hard, tough, horny, water-soluble materials useful as thickeners, binders, sizes, and water-soluble lubricants, and for the production of various shaped articles. The lower alkylene oxide polymers are also useful for the production of various shaped articles.

The following examples are illustrative:

EXAMPLE 1

A sample of granular poly(ethylene oxide) prepared by suspension polymerization with calcium amide catalyst, and having a reduced viscosity of 53 (0.2 gram of polymer per 100 milliliters of acetonitrile at 30° C.), was slurried in heptane to form a liquid-solid mixture containing 15.0 weight percent granular poly(ethylene oxide), based on the total weight of heptane and poly(ethylene oxide). This resulting slurry was subjected for 10 minutes to the shearing forces produced by a four-bladed laboratory Osterizer [1] operating at full speed. At the end of this period of time, the reduced viscosity of the polymer had decreased to 44.5.

EXAMPLE 2

A sample of the same polymer employed in Example 1 was slurried in heptane to give a liquid-solid mixture containing 15 weight percent polymer, based on the total weight of polymer and heptane. To the resulting slurry there was added 2.0 weight percent t-butylhydroperoxide based on the weight of the polymer. This slurry was subsequently subjected for three minutes to the shearing forces produced by the Osterizer described in the preceding example operating at full speed. At the end of this period of time, the reduced viscosity of the polymer was ascertained to be 36.5. After a total exposure of 10 minutes to the Osterizer at full speed, the reduced viscosity of the polymer measured 24.5.

A comparison of Examples 1 and 2 teach that the rate of decreasing the reduced viscosity of polymer slurried in a liquid hydrocarbon medium, which slurry is subjected to shearing forces such as high speed stirrer apparata, e.g., the laboratory Osterizer noted above, can be increased by incorporating a peroxide compound thereto.

EXAMPLE 3

A sample of granular poly(ethylene oxide) prepared by suspension polymerization with calcium amide catalyst, and having a reduced viscosity of 56.3 was admixed with hydrogen peroxide (i.e., an aqueous solution of $H_2O_2$ containing 50 weight percent of $H_2O_2$, based on the solution weight). The resulting admixture contained 7.0 weight percent of hydrogen peroxide, based on the weight of the polymer. This admixture was placed in an oven which was maintained at a temperature range from about 78° to 83° C. for 18 hours. Upon the termination of this treatment the polymer was a wax-like solid and has a reduced viscosity of 0.7.

It is pointed out that a milder temperature treatment than that used in Example 3 would result in a higher reduced viscosity or higher molecular weight polymer. In a preferred method, granular poly(ethylene oxide) of lower reduced viscosity or molecular weight than the original granular poly(ethylene oxide) starting material can be prepared by maintaining the temperature of the degradation process below about the print point of the poly(ethylene oxide), i.e., below about 50° C.

EXAMPLES 4-13

Various samples of granular poly(ethylene oxide) prepared by suspension polymerization with butylated calcium amide catalyst, and having a reduced viscosity in acetonitrile of 45, were slurried in heptane which contained various acidic viscosity reducing agents. The resulting slurries contained 15.0 weight percent of polymer, based on the total weight of polymer and heptane. These slurries were held at a temperature from about 39° to 42° C. for 2 hours. At the end of this period of time, the excess acidity present from residue products and unreacted reducing agents were neutralized by purging the individual slurries with ammonia gas at ambient room temperature and pressure. The polymer was recovered, by decanting, and reslurried for 20 minutes with fresh heptane (15 weight percent polymer, based on the total reslurry mixture). The polymer was again recovered, by decanting, and dried. The aqueous bulk viscosity of a 5.0 weight percent solution of polymer was determined. The results are set out in Table II below.

TABLE II

| Example Number | Degrading Agent | Weight Percent [1] | Aqueous Bulk Viscosity/cps.[4] |
|---|---|---|---|
| 4 | Formic Acid | 15 | 156,000 |
| 5 | Acetic Acid | 15 | 164,000 |
| 6 | do | 25 (badly blocked) | 96,200 |
| 7 | Propionic Acid | 15 | 207,000 |
| 8 | Peracetic Acid [2] | 7 | 1,700 |
| 9 | do.[2] | 7 | 1,240 |
| 10 | do.[2] | 10 | 680 |
| 11 | do.[2] | 10 | 265 |
| 12 | do.[3] | 7 | 1,040 |
| 13 | do.[3] | 3 | 21,900 |

[1] Weight percent of degrading agent, based on the weight of polymer.
[2] Added as a solution in ethyl acetate, 28 weight percent of peracetic acid, based on the total solution weight.
[3] Added as a solution in acetic acid, 40 weight percent of peracetic acid, based on the total solution weight.
[4] Five weight percent of polymer, based on total weight of polymer and water.

EXAMPLES 14-18

In the following series of experiments various samples of granular poly(ethylene oxide) prepared by suspension polymerization with butylated calcium amide catalyst, and having an intrinsic viscosity of 7.7, were slurried in heptane which contained varying concentrations of peracetic acid. The resulting slurries contained 15.0 weight percent of polymer, based on the total weight of polymer and heptane. The apparatus employed was a three-necked flask, using a common flat paddle stirring device operating at approximately 200 r.p.m. The slurries were heated with constant stirring to 39° to 42° C. using a heating mantle, and the temperature was recorded on a printing potentiometer using an iron-constantan thermocouple. The individual slurries were maintained at this temperature for approximately one hour. At the end of this period of time the polymer was separated from the heptane, by decantation, and reslurried in fresh heptane (reslurry contained 15 weight percent of polymer, based on total weight of polymer and heptane). Anhydrous ammonia gas was introduced into the slurry at ambient room temperature and pressure until residual acid material was neutralized. The polymer was again separated from the heptane, by decantation, and dried overnight at room temperature. Five weight percent aqueous solution of polymer, based on the total solution weight, were prepared and the aqueous bulk viscosities were determined. The results are set forth in Table III below.

TABLE III

| Example Number | Weight Percent Peracetic Acid [1] | Aqueous Bulk Viscosity/cps. |
|---|---|---|
| 14 | 0.1 | 77,000 |
| 15 | 2.0 | 26,750 |
| 16 | 3.0 | 10,940 |
| 17 | 4.0 | 2,060 |
| 18 | 5.0 | 200 |
| Control | 0.0 | 90,000 (estimated) |

[1] Weight percent of peracetic acid, based on the weight of polymer; added as 20 weight percent of peracetic acid in ethyl acetate, based on total solution weight.

Figure 1:
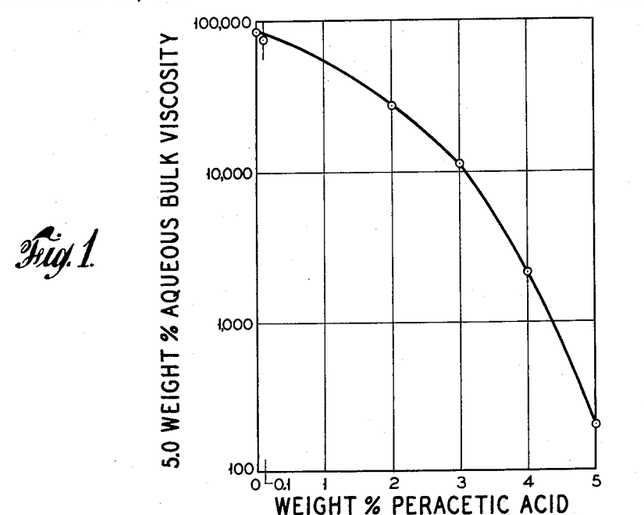
Figures 1 through 10 depict graphically the molecular degradation of various ethylene oxide polymers treated with varying quantities of peroxide compounds over a period of time.

It is evident from the results appearing in Table III above that a controlled method for decreasing the molecular weight of poly(ethylene oxide) can be effected by varying the concentration of peracetic acid employed. The above results of the peracetic acid treatment on granular poly(ethylene oxide) slurried in heptane is depicted graphically in Figure 1.

EXAMPLES 19-27

In the following examples several samples of granular poly(ethylene oxide) prepared by suspension polymeriza-

---

[1] Model No. 10 Osterizer, manufactured by John Oster Mfg. Co., Racine, Wisconsin.

tion with calcium amide catalyst were slurried in heptane which contained varying concentrations of peroxide compounds.

With the exception of Example 26 the resulting slurries contained 11.0 weight percent of polymer, based on the total weight of polymer and heptane; in Example 26, the resulting slurry contained 15 weight percent of polymer, based on the total weight of polymer and heptane. The apparatus employed in Examples 14 to 18 was used for these experiments. At the termination of the degradation process, the polymer was separated from the heptane, by decantation, and trice reslurried in fresh heptane. These reslurry treatments contained approximately 11.0 weight percent of polymer, based on the total weight of polymer and heptane. The polymer was again separated from the heptane, by decantation, and reslurried with heptane (same proportion as preceding reslurry treatments) containing di(2-ethylhexyl)amine in an amount equal to one-quarter of the concentration, by weight, of the peroxide compound originally used in the viscosity reducing process, together with 5.0 weight percent, based on the polymer weight, of N,N,N',N'-tetrakis(2-hydroxypropyl) ethylenediamine as an antioxidant. The polymer subsequently was separated from the slurry and dried at room temperature to 30° C. The reduced viscosities of the polymers (0.2 gram per 100 milliliters of acetonitrile at 20° C.) were determined and are shown in their respective tables below. In the following examples (19–27), the reduced viscosity (0.2 gram per 100 milliliters of acetonitrile at 20° C.) of the untreated polymers are shown in the tables in the horizontal column at zero minutes. The results are as follows:

(Example 19)
TABLE IV

| Peroxide Compound | Concentration,[1] Weight Percent | Temperature, °C. | Time, Minutes | Reduced Viscosity |
|---|---|---|---|---|
| Hydrogen Peroxide | 25 | 40–45 | 0 | 26.69 |
| | | | 5 | 3.86 |
| | | | 15 | 2.97 |
| | | | 30 | 4.81 |
| | | | 60 | 4.42 |
| | | | 90 | 2.64 |
| | | | 120 | 3.38 |
| | | | 150 | 2.38 |
| | | | 180 | 2.64 |

[1] Based on the weight of poly(ethylene oxide); added as 50 weight percent of $H_2O_2$ in water, based on the total weight of $H_2O_2$ and water.

Figure 2:
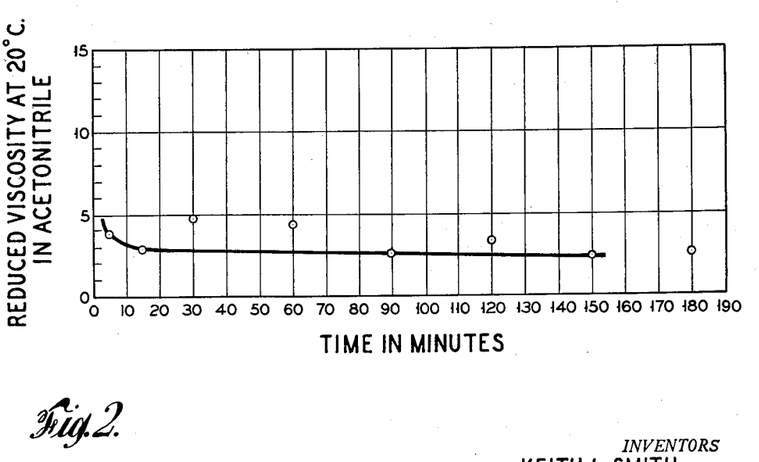

The polymer agglomerated at the commencement of the experiment; however, the agglomerated polymer broke up within two minutes to particle sizes several times larger than the original granular polymer. The results of Example 19 are shown graphically in Figure 2.

(Example 20)
TABLE V

| Peroxide Compound | Concentration,[1] Weight Percent | Temperature, °C. | Time, Minutes | Reduced Viscosity |
|---|---|---|---|---|
| Peracetic Acid | 5.0 | 37–40 | 0 | 56.69 |
| | | | 65 | 6.16 |
| | | | 135 | 4.33 |
| | | | 190 | 4.20 |
| | | | 300 | 4.04 |

[1] Based on the weight of poly(ethylene oxide); added as 26 weight percent of peracetic acid in ethyl acetate, based on the total weight of peracetic acid and ethyl acetate.

Figure 3:
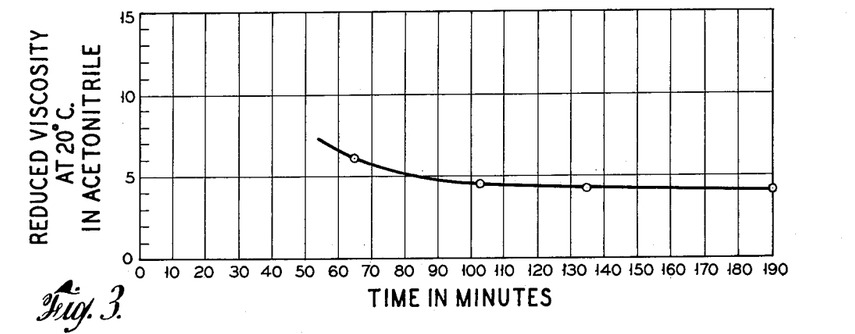

The results are shown graphically in Figure 3.

(Example 21)
TABLE VI

| Peroxide Compound | Concentration,[1] Weight Percent | Temperature, °C. | Time, Minutes | Reduced Viscosity |
|---|---|---|---|---|
| Peracetic Acid | 3.0 | 41–44 | 0 | 56.69 |
| | | | 15 | 16.08 |
| | | | 30 | 12.72 |
| | | | 45 | 10.80 |
| | | | 60 | 10.82 |
| | | | 75 | 9.97 |
| | | | 105 | 9.79 |

[1] Based on the weight of poly(ethylene oxide); added as 26 weight percent of peracetic acid in ethyl acetate, based on the total weight of peracetic acid and ethyl acetate.

Figure 4:
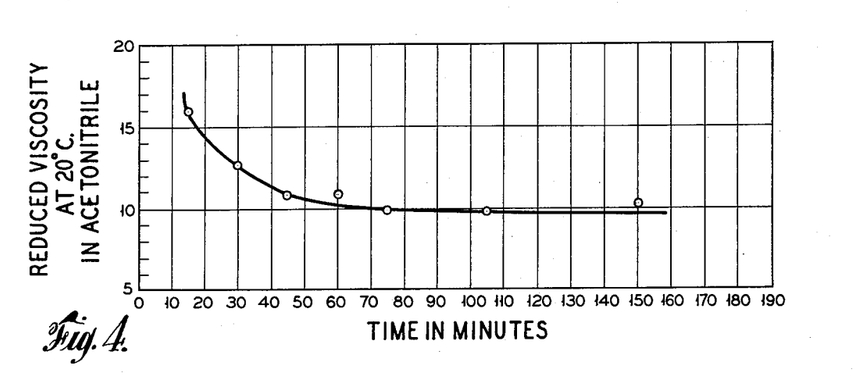

The results are depicted graphically in Figure 4.

(Example 22)
TABLE VII

| Peroxide Compound | Concentration,[1] Weight Percent | Temperature, °C. | Time, Minutes | Reduced Viscosity |
|---|---|---|---|---|
| Peracetic Acid | 3.9 | 35–43 | 0 | 56.69 |
| | | | 42 | 6.88 |
| | | | 75 | 4.44 |
| | | | 126 | 3.47 |
| | | | 210 | 3.88 |

[1] Based on the weight of poly(ethylene oxide); added as 26 weight percent of peracetic acid in ethyl acetate, based on the total weight of peracetic acid and ethyl acetate.

Figure 5:
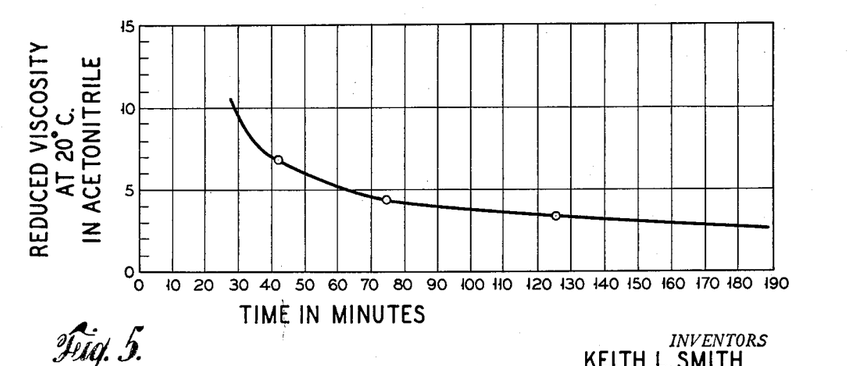

These results are shown in graph in Figure 5.

(Example 23)
TABLE VIII

| Peroxide Compound | Concentration,[1] Weight Percent | Temperature, °C. | Time, Minutes | Reduced Viscosity |
|---|---|---|---|---|
| t-butylhydroperoxide | 3.3 | 35–40 | 0 | 56.69 |
| | | | 78 | 26.41 |
| | | | 153 | 16.87 |

[1] Based on the weight of poly(ethylene oxide).

Figure 6:
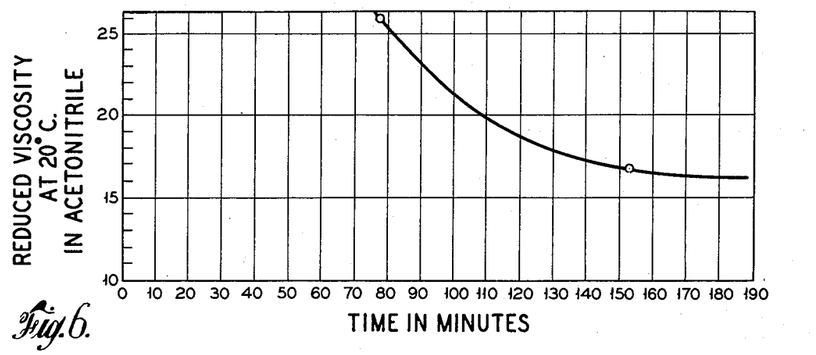

The above results are depicted graphically in Figure 6.

(Example 24)
TABLE IX

| Peroxide Compound | Concentration,[1] Weight Percent | Temperature, °C. | Time, Minutes | Reduced Viscosity |
|---|---|---|---|---|
| Hydrogen Peroxide | 3.3 | 35–47 | 0 | 56.69 |
| | | | 60 | 23.54 |
| | | | 150 | 20.69 |

[1] Based on the weight of poly(ethylene oxide); added as 30 weight percent of $H_2O_2$ in water, based on the total weight of $H_2O_2$ and water.

Figure 7:
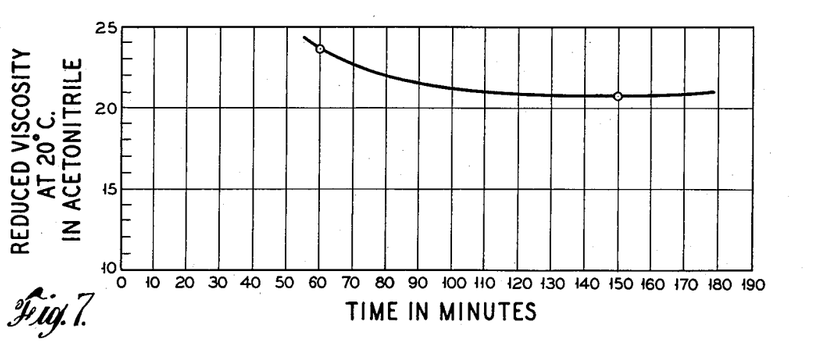

Some agglomeration of polymer was manifest at the beginning of the experiment but quickly dispersed to the original size of the granular poly(ethylene oxide) starting material. These results are depicted graphically in Figure 7.

(Example 25)

TABLE X

| Peroxide Compound | Concentration,[1] Weight Percent | Temperature, °C. | Time, Minutes | Reduced Viscosity |
|---|---|---|---|---|
| Peracetic Acid | 2.0 | 48–49 | 0<br>60<br>120<br>180<br>210<br>330 | 56.69<br>16.28<br>11.65<br>10.04<br>10.18<br>9.62 |

[1] Based on the weight of poly(ethylene oxide); added as 26 weight percent of peracetic acid in ethyl acetate, based on the total weight of peracetic acid and ethyl acetate.

Figure 8:
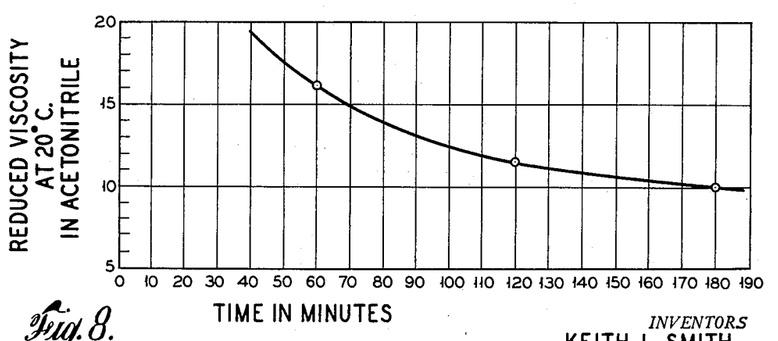

The above results have been plotted on the graph designated as Figure 8.

(Example 26)

TABLE XI

| Peroxide Compound | Concentration,[1] Weight Percent | Temperature, °C. | Time, Minutes | Reduced Viscosity |
|---|---|---|---|---|
| Hydrogen Peroxide | 13.5 | [2] 50–53 | 0<br>14<br>46<br>60<br>112 | 52.90<br>12.19<br>7.83<br>6.17<br>4.10 |

[1] Based on the weight of poly(ethylene oxide); added as 30 weight percent of $H_2O_2$ in water, based on the total weight of $H_2O_2$ and water.
[2] Last 52 minutes of treatment conducted at 70° C.

Figure 9:
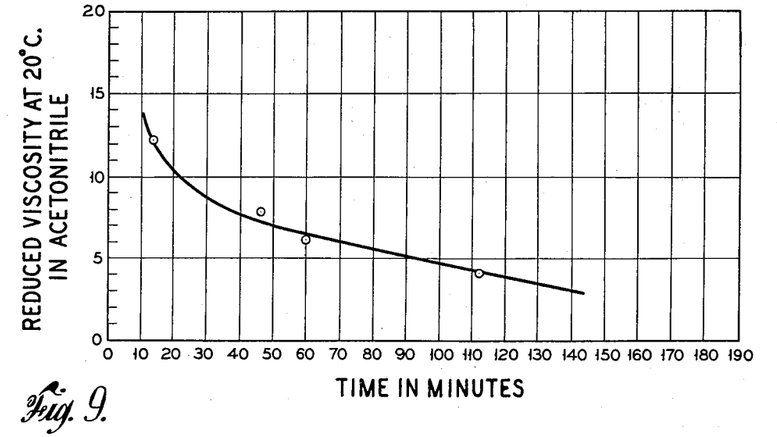

The above results are shown on the graph designated as Figure 9.

(Example 27)

TABLE XII

| Peroxide Compound | Concentration,[1] Weight Percent | Temperature, °C. | Time, Minutes | Reduced Viscosity |
|---|---|---|---|---|
| Hydrogen Peroxide | 7.0 | 72–80 (oven) | 0<br>10<br>20<br>60<br>1,020 | 52.90<br>21.37<br>24.22<br>7.26<br>0.34 |

[1] Based on the weight of poly(ethylene oxide); added as 30 weight percent of $H_2O_2$ in water, based on the total weight of $H_2O_2$ and water.

Figure 10:
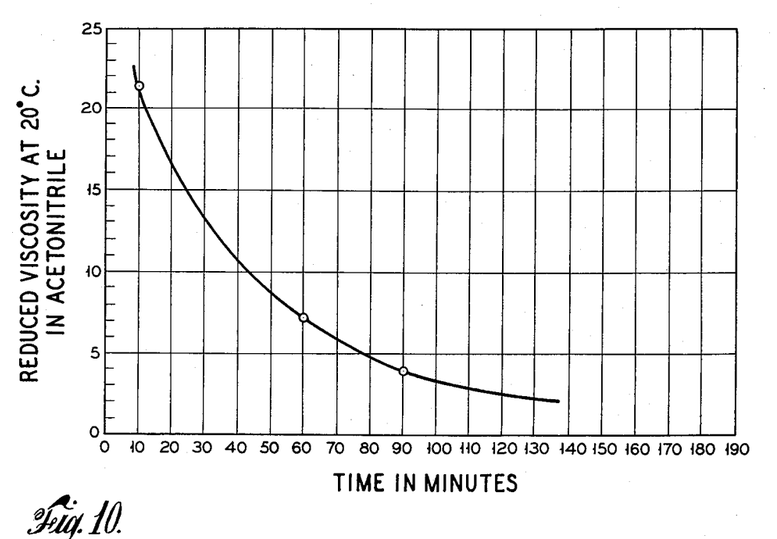

The above results are depicted graphically in Figure 10.

EXAMPLE 28

In the following examples, the same conditions employed in Example 27 were duplicated except no peroxide compound, i.e., hydrogen peroxide, was employed. The results are set out in Table XIII below.

TABLE XIII

| Peroxide Compound | Concentration,[1] Weight Percent | Temperature, °C. | Time, Minutes | Reduced Viscosity |
|---|---|---|---|---|
| None | | 72–80 (oven) | 0<br>10<br>60<br>1,020 | 52.90<br>45.80<br>42.20<br>12.74 |

A comparison of the results obtained from Examples 27 and 28 discloses that the rate of molecular degradation or decrease of reduced viscosity of the polymer increases noticeably with the incorporation therein of a peroxide compound.

It is further noted from the results obtained in the most rapid rate of reduced viscosity loss occurred during the first 30 minutes to one hour, although noticeable viscosity loss continued for at least one hour thereafter. In general, it is preferred not to allow the gradation process to continue for more than two to three hours since embrittlement of the granular polymer can occur which characteristic may be undesirable for various uses.

EXAMPLE 29

The ethylene oxide polymer used in this experiment was produced by suspension polymerization using calcium amide catalyst. This polymer had an intrinsic viscosity of 17.2 in acetonitrile, which would correspond to a reduced viscosity value (0.2 gram polymer per 100 milliliters of acetonitrile at 30° C.) of approximately 78. Ninety grams of this polymer was charged to a two-liter flask, together with 510 grams of heptane and 30 cc. of a 20 weight percent peracetic acid solution in ethyl acetate. The flask was equipped with a stainless steel turbine propeller 3¼ inches in diameter, driven by a heavy duty air motor. The resulting slurry was stirred at room temperature for 5 minutes before addition of the peracetic acid. Under these conditions the polymer did not agglomerate when the peracetic acid was added, but became more fluffy and occupied more space in the flask than before. The slurry was held at a temperature of 23.5° to 25° C. for 75 minutes after the addition of the peracetic acid, after which the polymer was separated, by decantation, from the heptane. The polymer was reslurried for 10 minutes in heptane in an amount equal to the original heptane charge and which contained 5 weight percent of N,N,N',N'-tetrakis(2-hydroxypropyl)-ethylenediamine antioxidant, based on the weight of the polymer. The polymer was again separated, by decantation, from heptane and placed in a gently flowing air stream to dry at room temperature for 16 hours. After the polymer had dried it was noted that the particle size of the polymer was finer and the powder had better dry flow properties than the starting polymer. There was no change in the color of the dry polymer which remained a dead white. A reduced viscosity determination made on this polymer gave a value of 5.63.

Sixteen grams of the product of this reaction was dissolved in 184 grams of distilled water. It was noted that the polymer dissolved very quickly and gave a pH value of 6.72 as measured on the Beckman pH meter. Unlike aqueous solution of the starting polymer, the solutions of polymer treated according to this experiment was found to be very clear. The aqueous bulk viscosity of the solution was measured using the Brookfield model LV Four-Speed viscometer, No. 4 spindle, at 25° C. At 6 r.p.m. the viscosity was found to be 62,500 centipoises, and at 12 r.p.m. 49,300 centipoises. Using the procedure previously described the pituitous characteristic was determined for this solution and found to have a value of 1.7 seconds (obtained by averaging 8 independent determinations). After ageing for 24 hours the aqueous bulk viscosity of this solution was again determined and found to be 54,200 centipoises at 6 r.p.m., and 42,300 centipoises at 12 r.p.m. A sample of the resin was molded at 115° C. to form a plaque. As a result of the molding operation some color developed and the reduced viscosity dropped to a value of 3.09. The physical properties of the plaque were determined as follows: tensile strength 1025 p.s.i., elongation at break 60 percent, ASTM stiffness 14,600 p.s.i., brittle temperature —18° C.

EXAMPLE 30

Poly(ethylene oxide) was prepared by suspension polymerization with calcium amide catalyst, and had an intrinsic viscosity of 17.2 in acetonitrile which corresponded to a reduced viscosity of 42.37. A one weight percent aqueous solution of this polymer (based on the solution weight) was prepared and the aqueous bulk viscosity thereof was determined on the Brookfield model RVF viscometer at 2 r.p.m., using the No. 2 spindle. The aqueous bulk viscosity value was determined to be 4,880 centipoises. Upon ageing for a period of one week at room temperature, this aqueous solution gave an aqueous bulk viscosity value of 2,500 centipoises under the same conditions as above. The aqueous bulk viscosity loss was 48.7 percent.

EXAMPLE 31

To a two-liter flask equipped with water-cooled condenser and heating mantle and stainless steel turbine impellor driven by an air motor, there were charged 50 grams of the same poly(ethylene oxide) employed in the preceding example (reduced viscosity of 42.37) and 450 grams of heptane. The resulting slurry was heated, with stirring at approximately 200 r.p.m., to a temperature of 38° C. To this slurry there was added ¼ cc. of 20.4 weight percent peracetic acid in ethyl acetate, based on the total solution weight, and agitation of the slurry was continued at a temperature of 38°–41° C. for one hour. The polymer subsequently was separated from the heptane, by decantation, and reslurried with an additional 450 cc. of fresh heptane. The reslurry was agitated for 10 minutes and 0.50 gram of di(2-ethylhexyl)amine was added thereto. The reslurry then was restirred for an additional 15 minutes. The polymer again was separated, by decantation, from the heptane and placed in a tray to air dry. The reduced viscosity of the polymer was determined to be 35.84 (0.2 gram of polymer per 100 milliliters of acetonitrile at 20° C.). This treatment therefore resulted in a 15.4 percent degradation. A one weight percent aqueous solution of this treated polymer (reduced viscosity value of 35.84) was prepared and the aqueous bulk viscosity thereof was determined in the manner previously described in Example 31. The aqueous bulk viscosity was determined to be 3,155 centipoises. Upon aging for a period of one week at room temperature, this aqueous solution gave an aqueous bulk viscosity value of 2,540 centipoises under the same conditions as above. This represented an aqueous bulk viscosity loss of 19.4 percent.

It is apparent from a comparison of the results obtained in Examples 30 and 31 that an aqueous solution of alkylene oxide polymer treated in accordance with this invention exhibits pronounced stability against molecular degradation during storage or on standing as compared with an untreated alkylene oxide polymer.

It will be apparent to those skilled in the art that the instant invention is capable of various modifications and embodiments without departing from the spirit and scope of said invention.

What is claimed is:

1. A process for decreasing the molecular weight of poly(olefin oxide) which has an apparent viscosity in the range of from about 200 to about 120,000 poises as determined by the Hagan-Poiseuille method at 150° C. and at a pressure of from about 10 to 2,000 p.s.i.g. which comprises contacting said poly(olefin oxide) with a peroxide compound selected from the group consisting of hydrogen peroxide, peracetic acid, t-butyl hydroperoxide, cumene hydroperoxide, diacetyl peroxide, dibenzoyl peroxide, diethyl peroxide, and peroxybenzoic acid, for a period of time sufficient to produce poly(olefin oxide) of lower molecular weight than the original poly(olefin oxide) starting material.

2. A process for decreasing the molecular weight of solid poly(olefin oxide) which comprises slurrying said solid poly(olefin oxide) in an inert normally liquid organic medium which is a non-solvent for said poly(olefin oxide), said organic medium containing a peroxide compound selected from the group consisting of hydrogen peroxide, peracetic acid, t-butyl hydroperoxide, cumene hydroperoxide, diacetyl peroxide, dibenzoyl peroxide, diethyl peroxide, and peroxybenzoic acid, and conducting the process for a period of time which is sufficient to produce a corresponding lower molecular weight solid poly(olefin oxide).

3. The process of claim 2 wherein said process is conducted at a temperature in the range of from about 20° to about 50° C., and wherein the concentration of said peroxide compound is in the range of from about 0.05 to about 15.0 weight percent, based on the weight of said poly(olefin oxide).

4. The process of claim 3 wherein said peroxide compound is peracetic acid.

5. The process of claim 3 wherein said peroxide compound is an aqueous hydrogen peroxide solution comprising from about 20 to about 90 weight percent of hydrogen peroxide based on the solution weight.

6. The process of claim 3 wherein said poly(alkylene oxide) starting material is granular poly(ethylene oxide) which has a reduced viscosity value of at least 1.0 as determined at a concentration of 0.2 gram of said poly(ethylene oxide) in 100 milliliters of acetonitrile at 30° C.

7. A process for decreasing the reduced viscosity of granular poly(ethylene oxide) which has a reduced viscosity value in the range of from about 1.0 to about 60 as determined at a concentration of 0.2 gram of said poly(ethylene oxide) in 100 milliliters of acetonitrile at 30° C. which comprises admixing said poly(ethylene oxide) with an inert normally liquid saturated hydrocarbon which is a non-solvent for said poly(ethylene oxide) to form a slurry comprising up to about 30 weight percent of said poly(ethylene oxide), based on the total weight of said poly(ethylene oxide) and said saturated aliphatic hydrocarbon, said saturated aliphatic hydrocarbon having incorporated therein a peroxide compound selected from the group consisting of hydrogen peroxide, peracetic acid, t-butyl hydroperoxide, cumene hydroperoxide, diacetyl peroxide, dibenzoyl peroxide, diethyl peroxide, and peroxybenzoic acid, the concentration of said peroxide compound being from about 1.0 weight percent to below that concentration wherein agglomeration of said poly(ethylene oxide) becomes manifest, said peroxide compound concentration being based on the weight of said poly(ethylene oxide); maintaining the resulting slurry at a temperature in the range of from about 20° to about 50° C., and recovering granular poly(ethylene oxide) of lower reduced viscosity than the original granular poly(ethylene oxide) starting material.

8. The process of claim 7 wherein said peroxide compound is peracetic acid employed as a solution in a liquid organic compound selected from the group consisting of acetic acid and ethyl acetate, said solution containing from about 10 to about 50 weight percent of peracetic acid, based on the total weight of peracetic acid and said liquid organic compound, and wherein the resulting slurry is maintained within the stated temperature range for a period of time of from about 10 minutes to about 3 hours.

9. The process of claim 7 wherein said peroxide compound is an aqueous hydrogen peroxide solution comprising from about 20 to about 90 weight percent of hydrogen peroxide, based on the solution weight, and wherein the resulting slurry is maintained within the stated temperature range for a period of time of from about 10 minutes to about 3 hours.

10. A process for decreasing the molecular weight of poly(olefin oxide) which has an apparent viscosity in the range of from about 200 to about 120,000 poises as determined by the Hagan-Poiseuille method at 150° C. and at a pressure of from about 10 to 2,000 p.s.i.g. which comprises admixing said poly(olefin oxide) with a peroxide compound selected from the group consisting of hydrogen peroxide, peracetic acid, t-butyl hydroperoxide, cumene hydroperoxide, diacetyl peroxide, dibenzoyl peroxide, diethyl peroxide, and peroxybenzoic acid, and subjecting the resulting admixture to a shear rate of at least 1,000 reciprocal seconds.

11. The process of claim 10 wherein said resulting admixture is slurried in an inert normally liquid organic medium which is a non-solvent for said poly(olefin oxide), the resulting slurry comprising up to about 30 weight percent of said poly(olefin oxide), based on the total weight of said poly(olefin oxide) and said liquid organic medium.

12. The process of claim 11 wherein said poly(olefin oxide) is poly(ethylene oxide) which has a reduced viscosity value in the range of from about 1.0 to about 60 as determined at a concentration of 0.2 gram of said poly(ethylene oxide) in 100 milliliters of acetonitrile at 30° C., wherein said process is conducted at a temperature in the range of from about 20° to about 50° C., and wherein said peroxide compound is peracetic acid.

13. A process for decreasing the molecular weight of poly(olefin oxide) which has an apparent viscosity in the range of from about 200 to about 120,000 poises as determined by the Hagan-Poiseuille method at 150° C. and at a pressure of from about 10 to 2,000 p.s.i.g. and subsequently stabilizing the resulting degraded product against further substantial molecular degradation which comprises the steps of: (1) admixing said poly(olefin oxide) with a peroxide compound selected from the group consisting of hydrogen peroxide, peracetic acid, t-butyl hydroperoxide, cumene hydroperoxide, diacetyl peroxide, dibenzoyl peroxide, diethyl peroxide, and peroxybenzoic acid, and maintaining the resulting admixture at a temperature in the range of from about 15° to about 150° C.; (2) slurrying the product from step 1 with an inert normally liquid organic medium which is a non-solvent for said poly(olefin oxide), and separating said poly(olefin oxide) from said liquid organic medium; and (3) repeating the procedure defined in step 2 until a substantially neutral pH poly(olefin oxide) is obtained.

14. The process of claim 13 wherein, under step 1, said admixture is slurried in an inert normally liquid organic medium which is a non-solvent for said poly(olefin oxide), and wherein said poly(olefin oxide) is separated from said liquid organic medium at a termination of step 1.

15. The process of claim 14 wherein said peroxide compound is peracetic acid.

16. A process for decreasing the molecular weight of poly(olefin oxide) which has an apparent viscosity in the range of from about 200 to about 120,000 poises as determined by the Hagan-Poiseuille method at 150° C. and at a pressure of from about 10 to 2,000 p.s.i.g. and subsequently stabilizing the resulting degraded product against further substantial molecular degradation which comprises the steps of: (1) slurrying said poly(olefin oxide) in an inert normally liquid saturated hydrocarbon which contains peracetic acid therein, said normally liquid saturated hydrocarbon being a non-solvent for said poly(olefin oxide), maintaining the resulting slurry at a temperature in the range of from about 15° to about 150° C., and separating said poly-olefin oxide) from said saturated hydrocarbon; (2) reslurrying the product from step 1 with an inert normally liquid saturated hydrocarbon which contains an alkaline material therein, said normally liquid saturated hydrocarbon being a non-solvent for said poly(olefin oxide), and recovering said poly(olefin oxide) therefrom.

17. The process of claim 16 wherein, under step 2, said alkaline material is employed in an amount which is at least sufficient to neutralize said residue in said poly(olefin oxide).

18. The process for decreasing the molecular weight of poly(ethylene oxide) which has a reduced viscosity value in the range of from about 1.0 to about 60 as determined at a concentration of 0.2 gram of said poly(ethylene oxide) in 100 milliliters of acetonitrile at 30° C., and subsequently stabilizing the resulting degraded product against further substantial molecular degradation which comprises the steps of: (1) admixing said poly-ethylene oxide) with an inert normally liquid saturated hydrocarbon which is a non-solvent for said poly(ethylene oxide) to form a slurry comprising up to about 30 weight percent of said poly(ethylene oxide), based on the total weight of said saturated hydrocarbon and said poly(ethylene oxide), said saturated hydrocarbon containing peracetic acid therein in an amount from about 1.0 to about 15 weight percent, based on the weight of said poly(ethylene oxide), maintaining the resulting slurry at a temperature in the range of from about 20° to about 50° C., and recovering said poly(ethylene oxide) from said normally liquid saturated hydrocarbon; (2) admixing the recovered poly(ethylene oxide) from step 1 with an inert normally liquid saturated hydrocarbon which is a non-solvent for said poly(ethylene oxide) in an amount so as to provide a slurry containing up to about 30 weight percent of said poly(ethylene oxide), said normally liquid saturated hydrocarbon containing therein an alkaline material in an amount which is at least sufficient to neutralize acid residue in said poly(ethylene oxide), and separating said poly(ethylene oxide) from said liquid saturated hydrocarbon.

19. The process for stabilizing granular poly(ethylene oxide) which has a reduced viscosity value in the range of from about 1.0 to about 60 as determined at a concentration of 0.2 gram of said poly(ethylene oxide) in 100 milliliters of acetonitrile at 30° C. which comprises the steps of (1) admixing said poly(ethylene oxide) with an inert normally liquid saturated hydrocarbon which is a non-solvent for said poly(ethylene oxide) to form a slurry comprising up to about 30 weight percent of said poly(ethylene oxide), based on the total weight of said saturated hydrocarbon and said poly(ethylene oxide), said saturated hydrocarbon containing peracetic acid therein in an amount from about 0.05 to below 1.0 weight percent, based on said poly(ethylene oxide), maintaining the temperature of the resulting slurry below about the print point of said poly(ethylene oxide), and recovering said poly(ethylene oxide) from said normally liquid saturated hydrocarbon; (2) admixing the recovered poly(ethylene oxide) from step 1 with with an inert normally liquid organic medium which is a non-solvent for said poly(ethylene oxide) in an amount so as to provide a slurry containing up to about 30 weight percent of poly(ethylene oxide), based on the total of said organic medium and said poly(ethylene oxide), said organic medium containing therein an alkaline material in an amount which is at least sufficient to neutralize acid residue in said poly(ethylene oxide), and separating said poly(ethylene oxide) from said liquid organic medium.

20. The process of claim 19 wherein, under step 2, said normally liquid organic medium is a normally liquid saturated hydrocarbon.

21. The process of claim 19 wherein said alkaline material is ammonia.

22. The process of claim 21 wherein, under step 2, said normally liquid organic medium is isopropanol.

References Cited in the file of this patent

Schildknecht: "Polymer Process" (High Polymers, vol. 10), Interscience Pub. Inc., N.Y., 1956, pp. 526–527.

Mark et al.: "Physical Chemistry of High Polymeric Solutions" (High Polymers, vol. 2), Interscience Pub. Inc., N.Y., 1950, page 473.

Grassie: "Chemistry of High Polymer Degradation Processes," Interscience Pub. Inc., N.Y., 1956, pp. 66–67.